UNITED STATES PATENT OFFICE.

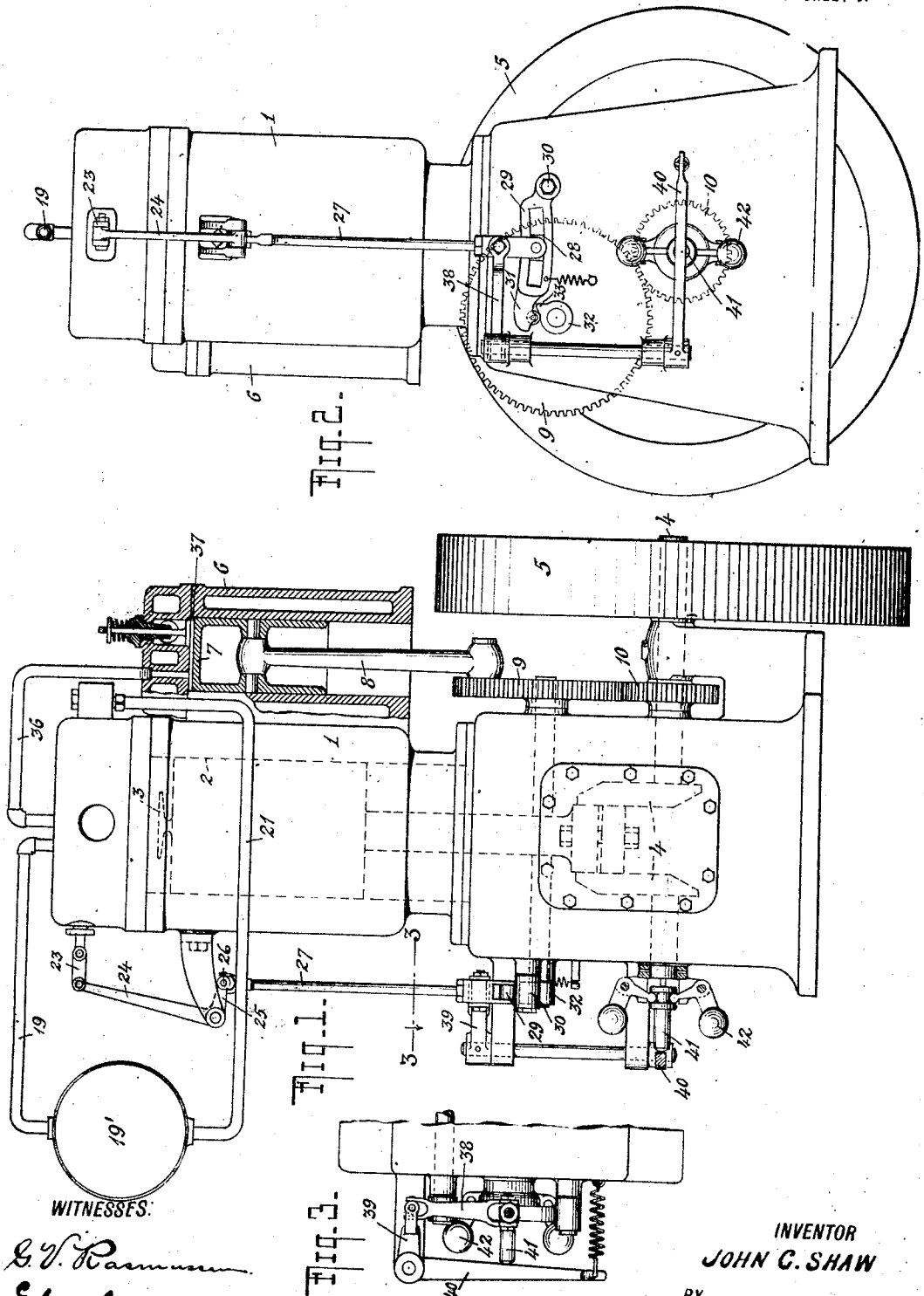

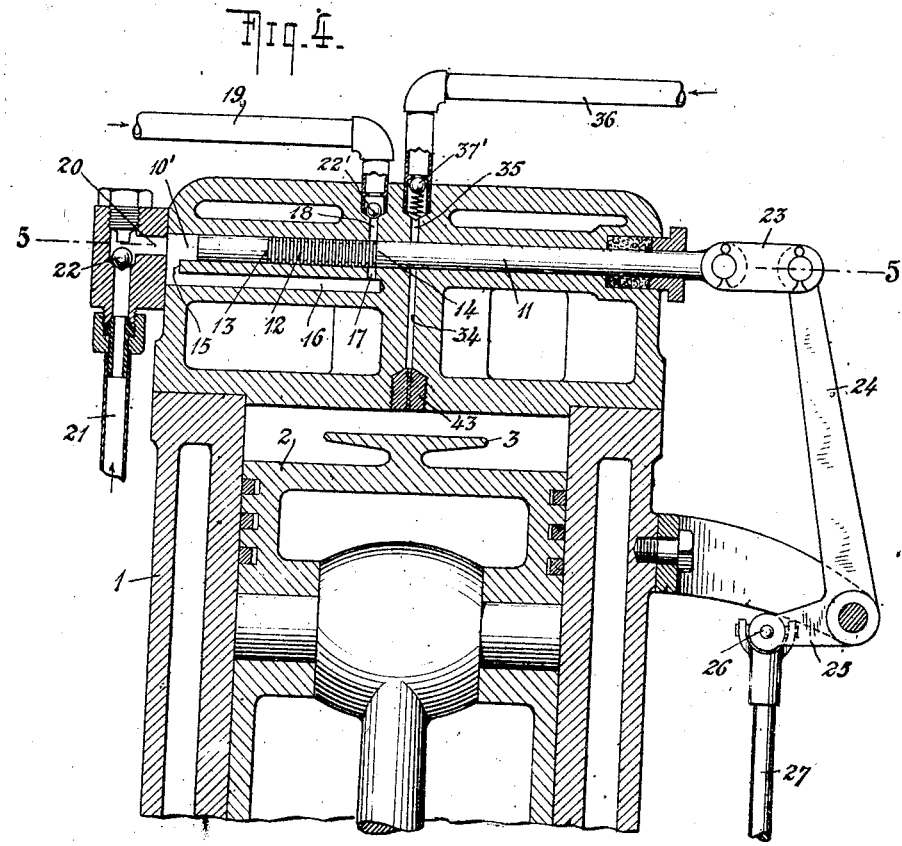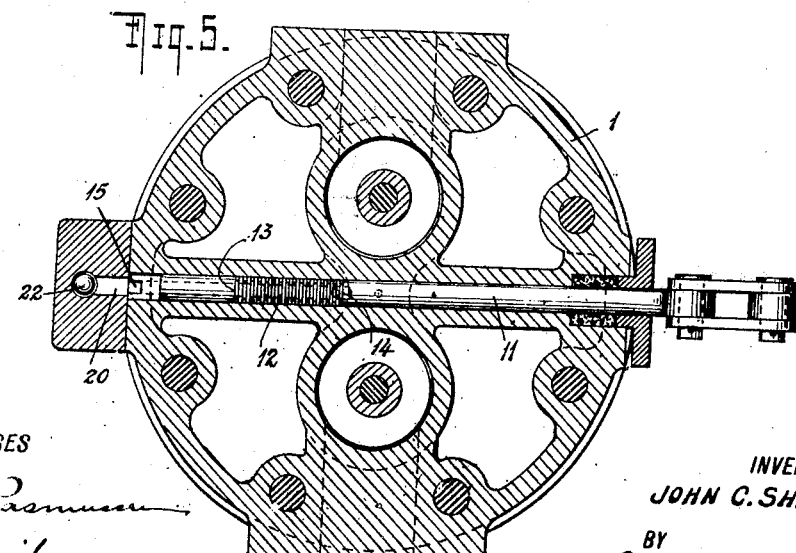

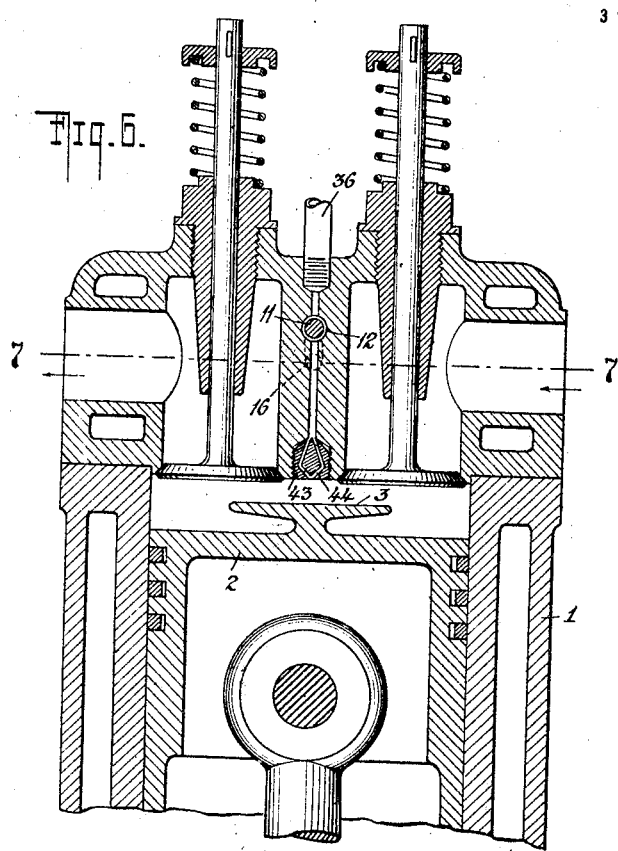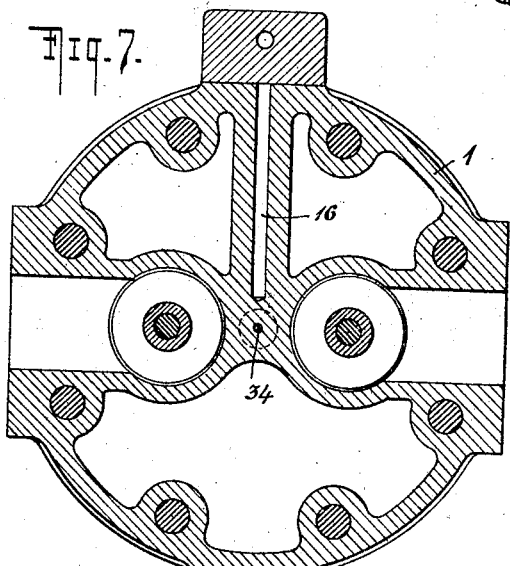

JOHN C. SHAW, OF BROOKLYN, NEW YORK, ASSIGNOR TO KELLER MECHANICAL ENGRAVING COMPANY, OF BROOKLYN, NEW YORK, A CORPORATION OF NEW YORK.

OIL-FEEDING MECHANISM FOR INTERNAL-COMBUSTION ENGINES.

1,290,374.  Specification of Letters Patent.  Patented Jan. 7, 1919.

Application filed February 23, 1917. Serial No. 150,459.

*To all whom it may concern:*

Be it known that I, JOHN C. SHAW, a citizen of the United States, residing in Brooklyn, Kings county, State of New York, have invented certain new and useful Improvements in Oil-Feeding Mechanism for Internal-Combustion Engines, of which the following is a specification.

My invention relates to internal combustion engines which employ liquid fuel and, more especially, to engines of this class in which the fuel, usually but not necessarily oil, is injected or otherwise placed as a solid in the explosion cylinder, just before each power stroke, to be there vaporized and burned.

In engines of this type it is essential, if they are to operate efficiently and economically, as also if they are to burn the fuel completely so as to avoid carbon deposits in the cylinder, that the fuel be very minutely subdivided immediately before or after it enters the combustion cylinder. This is because instant and complete vaporization is necessary and can only take place where the oil masses to be vaporized are very minute.

It is also necessary, to the same ends, that the quantity of oil fed into the cylinder for each power stroke should very accurately correspond to the instant load if constant speed is to be attained. Since the actual masses or volumes of oil required for each power stroke, even in engines of considerable size, are quite small, it is readily seen that accurately increasing or decreasing by a definite amount such masses for successive power strokes, in order to accurately correspond to the demands of a varying load, is a problem of no mean order. Such solutions of the problem as have thus far been offered have not been altogether satisfactory.

It is the object of the present invention to provide a means for positively feeding to the combustion cylinder, at an appropriate time during each power stroke, a determined number of exceedingly minute masses of oil, the individual masses being so small that they tend to vaporize with extreme readiness when suitably circumstanced, and the number of said minute masses being determined strictly and automatically to correspond with the load at that particular instant of time.

A further object of my invention is to so arrange a feed means as specified that it automatically charges itself with the requisite supply of oil for each successive power stroke so that no independent oil power pump is required.

Still a further object of my invention is to so combine a feed means as specified with an air pump, directly connected with and operated by the engine, that no air storage is required and so that the requisite supply of air, at the proper pressure, for feeding the oil into the combustion engine is supplied when and only when it is needed.

Still other objects of the invention will appear as the specification proceeds.

Briefly described my invention comprises a rod, slidably engaged with a suitable bore in the cylinder head and provided with a plurality of very shallow and very narrow spaced peripheral grooves forming, with the wall of the bore, a plurality of chambers, each of very minute volume. A compressed air inlet passage opens into the top wall of the bore while a similar passage opens oppositely from the bottom wall of the bore into the explosion cylinder. The individual grooves being filled with oil, the movement of the rod along the bore during the early part of the power stroke causes said grooves to be quickly and successively drawn past the passages referred to so that air entering at the inlet sweeps the groove contained oil masses into the cylinder. The lineal distance traveled by the rod for each feed stroke and, hence the number of grooves passing the injecting passages, is controlled by a governor of usual type in accordance with the load demands.

The grooved rod is so arranged, with reference to the oil reservoir that it not only serves to divide and hold the oil masses but it also serves as a pump piston to withdraw the oil from the reservoir and force it into the grooves.

The necessary air for injecting the oil masses is preferably obtained by connecting the air inlet passage above referred to to the compression end of a very small single acting pump geared directly to the engine. I arrange this pump so that its working cycle agrees with that of the engine and so its piston completes a compression stroke just as the piston of the combustion cylinder begins its power stroke. There is thus an ample supply of air for the oil injection at the exact time it is needed but at no other time.

My invention will be better understood by referring to the accompanying drawings in which Figures 1 and 2 represent respectively a side and end elevation of a single cylinder four cycle oil engine equipped with a preferred form of my invention; Fig. 3 represents a partial section, twice enlarged, taken along the line 3—3 of Fig. 1; Fig. 4 represents a partial section, twice enlarged, taken through the upper part of Fig. 1 (along a line 4—4) at a time such as to show the position of the feed rod with relation to the engine piston at the beginning of a power stroke; Fig. 5 represents a horizontal section taken along the line 5—5 of Fig. 4; Fig. 6 represents a section, similar to Fig. 4 but at right angles thereto, being taken along the line 6—6 of Fig. 1; and Fig. 7 represents a section, similar to Fig. 5, taken along the line 7—7 of Fig. 6.

Referring to the drawings, I have shown, and am about to describe, my invention as applied to a vertical single cylinder engine of the four cycle type arranged to burn oil fuel.

The engine comprises a cylinder 1, of usual construction, provided with a piston 2 having a disk like extension or ignition hot plate 3 joined to its inner end by a connection of small cross section. A crank shaft 4, of usual construction, is connected to the piston by the usual connecting rod and carries the usual fly wheel 5.

Mounted at the end of the cylinder is a small single acting air pump 6, having a piston 7, joined by a connecting rod 8 to a gear wheel 9 which meshes with a similar gear 10, half the diameter of 9, fixed to the crank shaft. The number of strokes of the air pump will therefore be just half the number of strokes of the engine piston. By suitably timing the engine and air pump with reference to one another, therefore, it is possible to so arrange that the air pump shall complete each compression stroke just as the engine piston is beginning to make its power stroke.

The cylinder head is provided with an accurate central cylindrical bore 10' in which an accurately ground and fitted feed rod 11 is adapted to slide linearly. This rod 11 is provided with a plurality of narrow, shallow and closely spaced peripheral grooves 12, these grooves beginning near the outer extremity of the rod at 13 and extending for a suitable distance to a point 14.

The end of bore 10' is connected, through a short vertical passage 15, with a passage 16 directly under bore 10' and parallel therewith. This passage 16 extends nearly to the center of the cylinder and a short passage 17 connects it near its inner end with a bore 10'. Immediately above this passage 17 is another passage 18 which opens into a pipe 19 leading to the oil reservoir 19'. The outer end of bore 10 also opens into a short passage 20 leading from the upper end of a pipe or passage 21 connected with the oil reservoir. A ball check valve 22 closes the top of passage 21 and permits oil to be drawn therefrom while preventing its return. Similarly a ball check valve 22' lies at the inner end of passage 19 and permits oil to be driven into said pipe through the passage while preventing any oil from being drawn therethrough from the reservoir.

One end of feed rod 11 extends outside of the cylinder head and is joined by a pivotally connected link 23, to one arm 24 of a bell crank lever rocking on a shaft fixedly supported by the cylinder 1; the other arm of this lever, 25, is connected by a ball joint 26 to an operating rod 27 the lower end of which is attached to a block 28 that is slidably engaged in a transversely disposed curved slot in a lift member 29 having one end pivoted to the crank case at 30. The other end of lift member 29 is provided with an extension 31 lying against a cam 32 having a suitably formed cam tooth 33. As shown in the several figures of the drawing, the cam tooth 33 is just about to engage the extension 31 and lift the member 29, thus pushing rod 27 upwardly and moving rod 11 outwardly.

In the very center of the cylinder head is a vertical passage 34 which leads from the compression space of the cylinder through the lower wall of bore 10. A similar short passage 35, opposite passage 34, leads from the top of bore 10 to a pipe 36 connecting with the compression space 37 of the air pump. This should preferably be controlled by a check valve 37' to prevent oil being driven back into said compression space 37 or pipe 36.

The lower end of operating rod 27 is connected by a link 38 with one arm 39 of a bell crank lever the other arm of which 40 is engaged by a member 41 controlled by a governor 42 upon the crank shaft. As the speed of the engine increases or decreases, as the case may be, the governor balls will position themselves on a circle of correspondingly greater or less diameter, thus causing member 41 to push lever 40 outwardly if the speed increases or permitting it to come inwardly if the speed decreases. This movement of lever 40 will correspondingly carry the lower end of rod 27 nearer the inner end of lift member 29 thus causing the length of stroke of feed rod 11 to decrease, or toward the pivotal end of lift member 29, thus causing the length of stroke of feed rod 11 to decrease.

It has already been stated that the drawings show the various parts in the positions they would occupy just as the engine piston has started on its power stroke and the air piston has completed its compression stroke. The oil reservoir 19', pipe 21, passages 20, 15 and 16, and that portion of bore 10' at the inner end of rod 11 should be assumed to be full of fuel oil. The grooves 12 of feed rod 11 should also be assumed to be full of fuel oil.

As the engine piston 2 moves downwardly the cam shaft 32 revolves thus engaging cam tooth 33 with lift member 29 which is raised so as to slide rod 11 linearly outwardly or to the right (Fig. 4). As each groove passes between passages 34 and 35, the air compressed in the pump compression space 37, and in the pipe 36, is admitted to the oil groove and forces oil through passage 34 at high velocity into the cylinder end and against the hot plate 3 where it is shattered and vaporized. The grooves being close together and the movement of the rod 11 very quick, the minutely subdivided masses of oil contained in the successive grooves are shot into the combustion space at intervals of time which do not appreciably differ from one another. The oil is thus very completely and quickly vaporized.

The out or feed stroke of the feed rod 11 is completed and all of the oil is in the combustion space before the piston has gotten very far on its power stroke. The maximum length of that portion of the stroke over which the oil feeding is extended can, of course, be given any desired value, in the original construction of the engine, by suitably determining the cam tooth 33.

During the remainder of the power stroke and during as much of the succeeding scavenging and suction strokes as may be thought best the feed rod 11 is being returned to the original position shown in Fig. 4. The length of time taken to complete this return is, of course, also determined by the shape of the cam tooth 33.

As the operating rod 11 thus moves inwardly (to the left, Fig. 4) the emptied grooves are, successively, again carried past the passages 35 and 34. However, there is no danger of any oil, which may have remained in the grooves, being injected into the combustion cylinder at this time so as to cause premature combustion, inasmuch as the air pump piston is now on its out stroke so that there is no compressed air available for throwing this remanent oil into the cylinder. As soon as the grooves reach passages 17 and 18, connecting the lower passage 16 with the upper oil reservoir pipe 19, oil will be forced, by the continued inward movement of rod 11, out of passage 16 through passage 17 into the grooves and across through passage 18, past check valve 22' into pipe 19. Any air in the grooves will in this way be driven past the check valve and back into the oil reservoir while the grooves will be completely filled with oil.

In practice I find it advisable that the passage 34, as it opens into the combustion space of the engine cylinder, shall terminate in a spray nozzle 43. As shown, this comprises two divergent channels 44, of very small diameter which converge again, so as to meet at substantially right angles to one another, just as they open into the cylinder. The entering fuel divides between these two channels and the two jets thus determined are driven forcibly against one another by the compressed air behind them so as to mutually shatter one another into a fine spray lending itself readily to vaporization.

While my invention is illustrated and described as applied to a single cylinder engine, it is obvious that it may be readily adapted to an engine with any number of cylinders. Furthermore, by using a suitable system of valves to control the several air and oil passages, a single feed rod may be used to supply fuel to two separate power cylinders, since these cylinders require their fuel at different times. Similarly, the invention is applicable to any engine driven by liquid fuel, whether such fuel be an oil, in the usual sense of the word, or otherwise.

By varying the diameter of the fuel and pump rod as also by varying the number and dimensions of its grooves, a very wide range in the amount and character of the fuel supply may be obtained.

Instead of grooves, other forms of spaced fuel storage recesses of small capacity may be substituted therefor.

Any usual ignition system may be substituted for hot plate 3.

Having described my invention, I claim:—

1. In combination, in an internal combustion engine, a cylinder provided with a bore closed at one end, a linearly slidable combined pump and feed rod having a plurality of spaced parallel grooves fitted within said bore, an inlet passage connected with an oil supply and controlled by a check valve opening into the working space of said bore at the end of said rod, inlet and outlet openings disposed opposite one another in said bore, the former connected with an air supply and the latter with the combustion space, a second pair of opposite inlet and outlet openings in said bore the former connected with the aforesaid working space and the latter with the aforesaid oil supply and being further controlled by a check valve, and means driven by the engine for reciprocating said rod synchronously with the engine and to an extent varying with each power stroke according to the load.

2. In combination, in an internal combustion engine, a cylinder provided with a bore closed at one end, a linearly slidable combined pump and feed rod having a plurality of spaced parallel grooves fitted within said bore, an inlet passage connected with an oil supply and controlled by a check valve opening into the working space of said bore at the end of said rod, inlet and outlet openings disposed opposite one another in said bore the latter being connected with the combustion space, means for supplying compressed air to said inlet during the power stroke of the engine, a second pair of opposite inlet and outlet openings in said bore the former connected with the aforesaid working space and the latter with the aforesaid oil supply and being further controlled by a check valve, and means driven by the engine for reciprocating said rod synchronously with the engine and to an extent varying with each power stroke according to the load.

3. In combination, in an internal combustion engine, a cylinder provided with a bore closed at one end, a linearly slidable combined pump and feed rod having a plurality of spaced parallel grooves fitted within said bore, an inlet passage connected with an oil supply and controlled by a check valve opening into the working space of said bore at the end of said rod, inlet and outlet openings disposed opposite one another in said bore the latter being connected with the combustion space, an air pump having its compression space connected with said inlet and timed with relation to the engine so that its compression stroke is substantially completed as the engine power stroke begins, a second pair of opposite inlet and outlet openings in said bore the former connected with the aforesaid working space and the latter with the aforesaid oil supply and being further controlled by a check valve, and means driven by the engine for reciprocating said rod synchronously with the engine and to an extent varying with each power stroke according to the load.

4. A combined fuel pump and feed for internal combustion engines comprising a casing provided with a bore serving as a pump cylinder, a linearly slidable rod in said bore having a plurality of spaced parallel grooves and serving as a piston, an inlet opening controlled by a check valve and adapted to be connected to an oil reservoir for the working space at the end of the bore, inlet and outlet openings disposed opposite one another in said bore the former adapted to be connected with an air supply and the latter adapted to be connected with the engine combustion space, and a second pair of opposite inlet and outlet openings in said bore the former connected with the aforesaid working space and the latter adapted to be connected with the aforesaid oil supply and being further controlled by a check valve.

5. In combination, in an internal combustion engine, an oil supply, a cylinder provided with a bore closed at one end, a slidable combined pump and feed rod having a plurality of spaced grooves fitted within said bore, inlet and outlet openings disposed opposite one another in said bore, the former connected with an air supply and the latter with the combustion space, a second pair of inlet and outlet openings in said bore, the former connected with the working space at the end of the rod and the latter with the oil supply, said oil supply being also connected with said working space and controlled by a check valve, and means controlled by the engine for giving said rod a oscillatory movement synchronous therewith.

In testimony whereof I have hereunto set my hand.

JOHN C. SHAW.